(12) United States Patent
Flores Giraldo et al.

(10) Patent No.: US 9,243,695 B2
(45) Date of Patent: Jan. 26, 2016

(54) ELECTRO MECHANICAL ACTUATOR

(71) Applicant: EADS Construcciones Aeronauticas S.A., Getafe (ES)

(72) Inventors: Santiago Flores Giraldo, Getafe (ES); Francisco Javier Fernandez Garcia, Getafe (ES)

(73) Assignee: EADS Construcciones Aeronauticas S.A., Madrid (ES)

( * ) Notice: Subject to any disclaimer, the term of this patent is extended or adjusted under 35 U.S.C. 154(b) by 402 days.

(21) Appl. No.: 13/762,588

(22) Filed: Feb. 8, 2013

(65) Prior Publication Data

US 2013/0213160 A1 Aug. 22, 2013

(30) Foreign Application Priority Data

Feb. 10, 2012 (EP) .................................... 12382047

(51) Int. Cl.
| | |
|---|---|
| *F16H 19/04* | (2006.01) |
| *B64C 13/50* | (2006.01) |
| *B64C 13/42* | (2006.01) |
| *F16H 57/00* | (2012.01) |
| *F16H 57/01* | (2012.01) |

(52) U.S. Cl.
CPC ............... *F16H 19/04* (2013.01); *B64C 13/42* (2013.01); *B64C 13/50* (2013.01); *F16H 2057/0081* (2013.01); *F16H 2057/018* (2013.01); *Y02T 50/44* (2013.01); *Y02T 50/54* (2013.01); *Y10T 74/18096* (2015.01)

(58) Field of Classification Search
CPC .............. Y10T 74/18096; F16H 19/04; F16H 2057/018; F16H 2057/0081; B64C 13/50; B64C 13/42; Y02T 50/44; Y02T 50/54
See application file for complete search history.

(56) References Cited

U.S. PATENT DOCUMENTS

| | | | |
|---|---|---|---|
| 2,201,670 A | | 5/1940 | Kraus |
| 2,883,183 A | * | 4/1959 | Finsterwalder et al. ......... 49/26 |
| 3,133,453 A | * | 5/1964 | Lapointe .................... 74/424.93 |
| 3,440,886 A | * | 4/1969 | Meeker ........................ 175/170 |
| 3,648,535 A | * | 3/1972 | Maroth ...................... 74/424.93 |
| 4,440,038 A | * | 4/1984 | Potter ........................ 74/424.93 |
| 4,541,297 A | * | 9/1985 | Fujita ............................ 74/424.6 |
| 4,665,765 A | * | 5/1987 | Heine ............................... 74/458 |
| 5,644,950 A | * | 7/1997 | Parsons ............................ 74/57 |

(Continued)

FOREIGN PATENT DOCUMENTS

| | | |
|---|---|---|
| EP | 1731421 | 12/2006 |
| JP | 59026658 | 2/1984 |

OTHER PUBLICATIONS

European Search Report, May 18, 2012.

*Primary Examiner* — David M Fenstermacher
(74) *Attorney, Agent, or Firm* — Greer, Burns & Crain Ltd.

(57) ABSTRACT

A two-stage linear actuator particularly applicable to aircraft control surfaces. The first stage comprises a rotary input shaft driven by an electric motor having a helical threaded zone in its external surface at its inner end and a plurality of first helical roller gears configured to engage with the rotary input shaft in its helical threaded zone for rotating together. The second stage comprises a plurality of second helical roller gears configured to engage with the first helical roller gears for rotating together and with an output shaft having a helical threaded zone in its external surface at its inner end for converting the rotation of the second helical roller gears in a linear movement of the output shaft.

10 Claims, 2 Drawing Sheets

(56) References Cited

U.S. PATENT DOCUMENTS 5,709,127 A * 1/1998 Parsons .............................. 74/57
5,860,324 A * 1/1999 Parsons ........................... 74/441

2005/0103928 A1    5/2005 Flatt
2005/0269887 A1 * 12/2005 Blanding et al. .............. 310/112
2007/0295125 A1 * 12/2007 Marthaler et al. ........... 74/89.29

* cited by examiner

ELECTRO MECHANICAL ACTUATOR

RELATED APPLICATIONS

The present application claims priority to European Patent Application filed Feb. 10, 2012 as application number 12382047.4, the entire contents of which are incorporated herein by reference.

FIELD OF THE INVENTION

The present invention relates to an electro mechanical actuator and more in particular to an electro mechanical actuator able to survive to a jamming of its internal mechanical components.

BACKGROUND OF THE INVENTION

Linear actuators are used in many industrial products. In the aeronautical industry in particular are used as actuators of aircraft control surfaces and other aircraft components.

Generally, each aircraft control surface is actuated by multiple linear actuators in parallel, so that in case of power loss of one of them, the surface can be controlled with the remaining actuators. As this configuration has the disadvantage that the jamming of one of the actuators may produce a blocking of the surface, the aeronautic regulations require extremely low jamming probabilities (of the order of 10e-9) to said actuators. Hydraulic actuators are capable of meeting this requirement.

The trend toward greater electrification of aircraft ("More Electrical Aircraft", MEA), oriented toward a reduction of weight and maintenance cost of systems, has led to the introduction of new technologies in flight command systems, including primary flight command systems.

Electro-hydrostatic actuators (EHAs) have been incorporated in new platforms (A380, A400, A350, F35, . . . ). This type of actuator has an integrated hydraulic system so that interconnection with the power system of the aircraft is purely electric, but its power transmission to the aircraft control surface is through an integrated hydraulic actuator. They meet the jamming probability target because the power transmitted to the surface is done by means of a hydraulic actuator and at the same time allows the elimination of the aircraft hydraulic system from the aircraft. This technology is considered an intermediate step in the progressive electrification of aircraft actuation systems.

Electro Mechanical Actuators (EMA) have not yet been implemented in primary flight command systems (except for experimental applications), despite their potential advantages with respect to complexity, efficiency, weight and maintainability. The main reasons why EMAs have not been introduced in primary flight command systems controls are:

The probability of jamming of current available actuators is not as low as required.

The reversibility of these actuators in case of loss of electrical power is not as good as in the case of actuators with a hydraulic output stage, especially if the mechanical advantage between the electric motor and the output is high.

Commonly applied technologies in the output stage of EMA actuators (primarily ball screws and mechanical reduction gearbox) do not fully guarantee the above requirements because of:

The mechanical gearbox usually connected between the electric motor and the screw has a higher jamming probability than required for the application. The ball screw has the same problem by incorporating re-circulating mechanical elements, which, when blocked, impede or degrade the movement of the screw up to a non-functionality level.

The reversibility of the ball screw in case of jamming is low, because small pitches are commonly used to minimize the size of the electric motor.

The planetary roller screws have advantages over ball screws with similar efficiency in terms of strength, life and load capacity among others. Their design is simpler and does not include circulation elements. However, they are not free of jamming in their moving parts (rollers, synchronism crown, gears, etc.) by the presence of external contamination, fractures, etc., thus jamming the output shaft of the actuator.

U.S. Pat. No. 7,410,132 and U.S. Pat. No. 7,610,828 disclose ball screw linear actuators incorporating means for releasing the output shaft in case of jamming.

One disadvantage of these proposals is that the ball screw has recirculating elements susceptible to jamming in the recirculation channel. They involve therefore a relatively high probability of jamming.

Another disadvantage is that in both proposals the unlocking of the output linear element is performed at the level of the nut of the screw. Then, after releasing the output linear element, a parallel actuator (in the above-mentioned case of a flight control surface actuated by a set of parallel actuators) should drag both the screw and the nut. This means that the actuator shall be designed leaving free the volume swept by the screw and the nut along the whole run of the parallel actuator. In addition, the inertia to be dragged by the parallel actuator is the inertia of the screw and the nut.

US Patent Application US2007/295125 discloses a linear actuator comprising:

a rotatory input shaft driven by an electric motor;

an output shaft having a helical threaded zone in its external surface at its inner end;

a first roller gear configured to rotate with respect to it axis when the input shaft rotates;

a plurality of second roller gears configured to engage with the first roller gear and with the output shaft in its helical threaded zone so that the rotation of the first roller gear is firstly transmitted to the second roller gears, which rotate with respect to their axis, and secondly converted in a linear movement of the output shaft.

SUMMARY OF THE INVENTION

An object of the present invention is to provide a linear actuator driven by an electric motor with a lower probability of jamming than those known linear actuators with re-circulating elements.

Another object of the present invention is to provide a linear actuator allowing decoupling the output shaft from other mechanical components of the transmission chain.

These and another objects are met by a two-stage linear actuator, the first stage comprising a rotary input shaft driven by an electric motor having a helical threaded zone in its external surface at its inner end and a plurality of first helical roller gears configured to engage with the rotary input shaft in its helical threaded zone for rotating together; the second stage comprising a plurality of second helical roller gears configured to engage with an output shaft having a helical threaded zone in its external surface at its inner end for converting the rotation of the second helical roller gears in a linear movement of the output shaft, the second helical roller gears being also configured to engage with the first helical roller gears for rotating together.

Advantageously, the input shaft is a hollow shaft and the output shaft is placed in an inner conduit comprising the inside of the input shaft.

Advantageously, the second helical roller gears have two threaded zones at two different levels: a first threaded zone for engaging with the first helical roller gears and a second threaded zone for engaging with the helical threaded zone of the output shaft.

In an embodiment of the invention, the cooperating pairs of first and second helical roller gears are mounted in gear carriers in a pivoting manner with respect to the axis of the first helical roller gears so that they can hold the second helical roller gears in an engaging or in a disengaging position with respect to the output shaft. Therefore the linear actuator is provided with a means for releasing the output shaft in a jamming event or in an event where a dangerous degradation of a mechanical component is detected.

The releasing system is implemented by the interaction of the gear carriers with a disk mounted rotatably on the output shaft for keeping the gear carriers with the second helical roller gears engaged or disengaged with respect to the output shaft.

A particular field of application of the linear actuator of this invention is the actuation of aircraft components and particularly aircraft control surfaces.

Other desirable features and advantages of the linear actuator according to this invention will become apparent from the subsequent detailed description of the invention and the appended claims, in relation with the enclosed drawings.

DETAILED DESCRIPTION OF THE PREFERRED EMBODIMENTS

Figure 1:
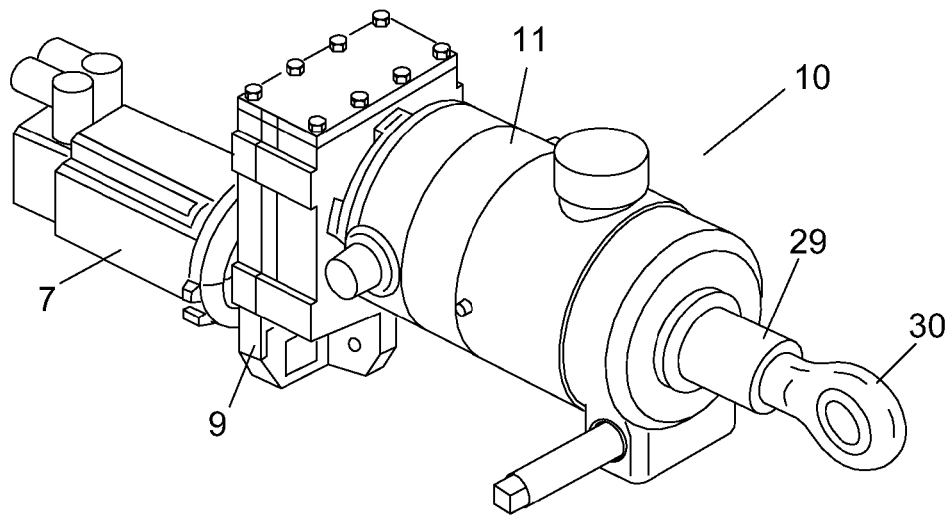
FIG. 1 is a perspective view of a linear actuator according to an embodiment of this invention.

FIG. 1 shows an overview of a linear actuator 10 for moving linearly an actuating member 30 according to the embodiment of the invention that will be now described.

A set of linear actuators 10 can be used, for example, for actuating a control surface of an aircraft.

The linear actuator 10 converts the rotatory motion of an input shaft located inside the casing 11, which is driven by an electric motor 7 through a gearbox 9, in a controlled linear movement of an output shaft 29 to which the actuating member 30 is connected. The linear actuator 10 could also be directly driven by the electric motor.

Figure 2:
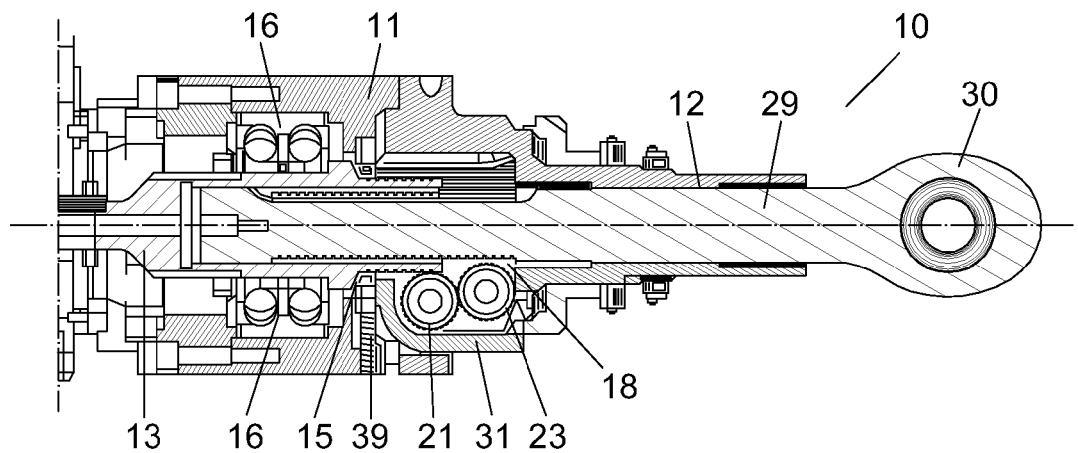
FIG. 2 is a partial cross sectional view of a linear actuator according to an embodiment of this invention.
Figure 3:
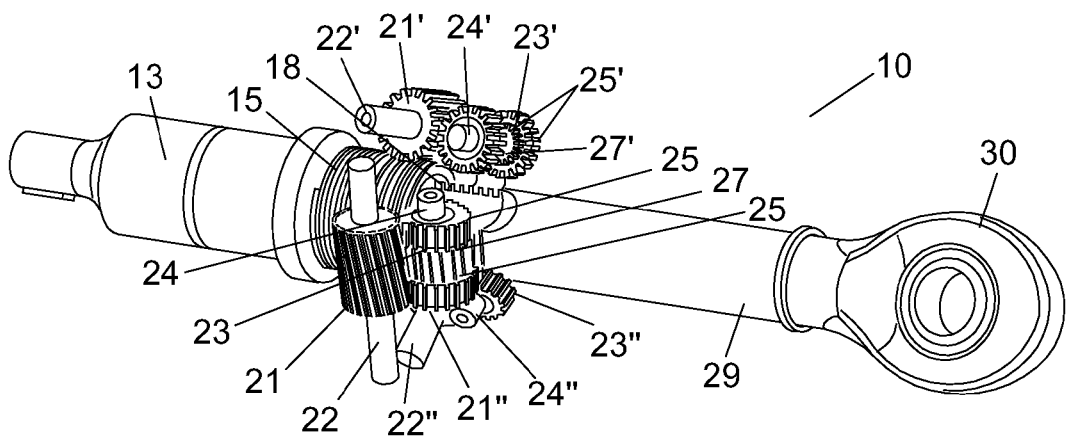
FIG. 3 is a perspective view of the main components of a linear actuator according to an embodiment of this invention.

FIGS. 2 and 3 show the main components of the linear actuator 10: an input shaft 13, an output shaft 29, three first helical roller gears 21, 21', 21" and three second helical roller gears 23, 23', 23" (although in the FIG. 3 only the first roller gears 21, 21' and the second roller gears 23, 23' are clearly shown, the corresponding numerical references for the first roller gears 21" and for the second roller gear 23" are also included in the FIG. 3 and will used in this specification).

The input shaft 13 is rotatably mounted on the casing 11 by means of a pair of contact bearings 16 axially preloaded to achieve the required stiffness. The input shaft is configured as a hollow cylinder with a helical threaded zone 15 at its inner end in its external surface. At its outer end the input shaft is connected to the gearbox 9.

The output shaft 29 is placed in a longitudinal conduit delimited by the input shaft 13 and a tubular housing 12 inside the casing 11 so that it can be displaced longitudinally along said conduit. The output shaft 29 has a helical threaded zone 18 in its outer surface. The length of the helical threaded zone 18 is the maximum length foreseen for the displacement of the output shaft 29. At its outer end the output shaft 29 is connected to an actuating member 30 suitably shaped for the function to be performed by the linear actuator 10.

The first helical roller gears 21, 21', 21" are arranged for engaging with the input shaft 13 in the helical threaded zone 15. They are arranged tangentially with respect to the input shaft 13 so that the rotation of the input shaft 13 produces a rotation of the three roller gears 21, 21', 21" around their axis 22, 22', 22".

The second helical roller gears 23, 23', 23" are arranged with their axis 24, 24', 24" parallel to the axis 22, 22', 22" of the first helical roller gears 21, 21', 21" for engaging, on the one side, with the first helical roller gears 21, 21', 21" and, on the other side, with the output shaft 29 in its helical threaded zone 18. The rotation of the first helical roller gears 21, 21', 21" is transmitted to the second helical roller gears 23, 23', 23" and the rotation of the second helical roller gears 23, 23', 23" is converted in a linear movement of the output shaft 29. The engagement of the second helical roller gears 23, 23', 23" with the first helical roller gears 21, 21', 21" is done in first helical threaded zones 25, 25', 25' and the engagement of the second helical roller gears 23, 23', 23" with the helical threaded zone 18 of the output shaft 29 is done in second helical threaded zones 27, 27', 27".

Said first and second helical threaded zones 25, 25', 25'; 27, 27', 27" are arranged at a different level for allowing the simultaneous engagement of the second helical roller gears 23, 23', 23" to the first helical roller gears 21, 21', 21" and to the output shaft 29.

Figure 4A:
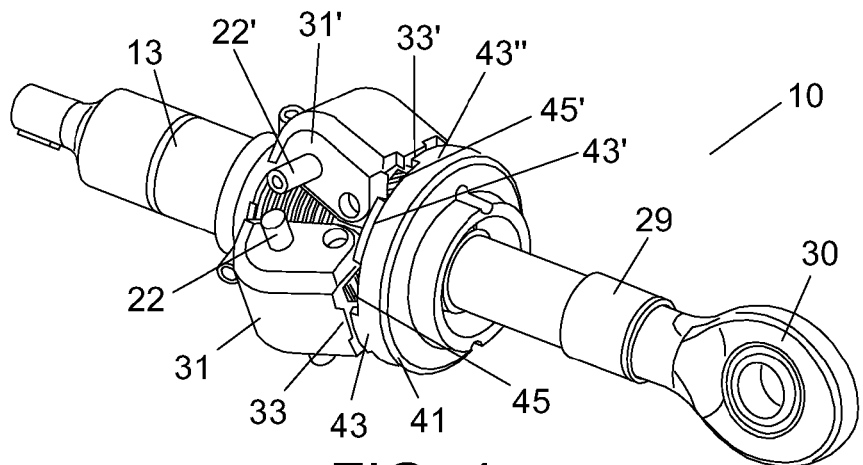
FIGS. 4a and 4b are perspective views of the main components of a linear actuator according to an embodiment of this invention incorporating releasing means of the output shaft in, respectively an engaged and a disengaged position.
Figure 4B:
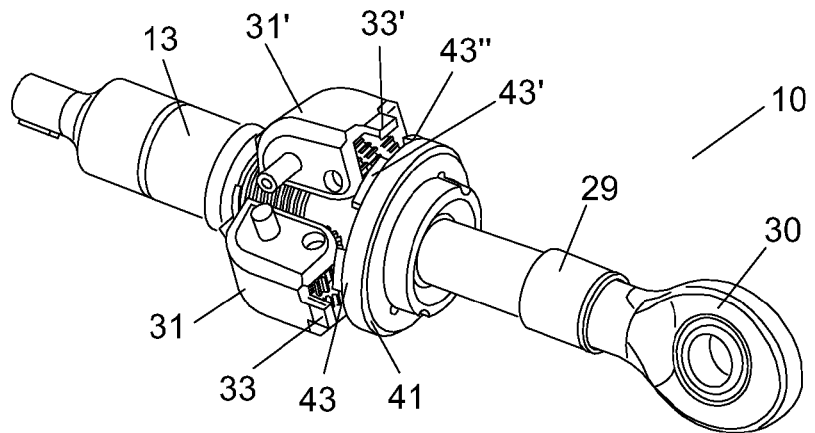
Figure 5:
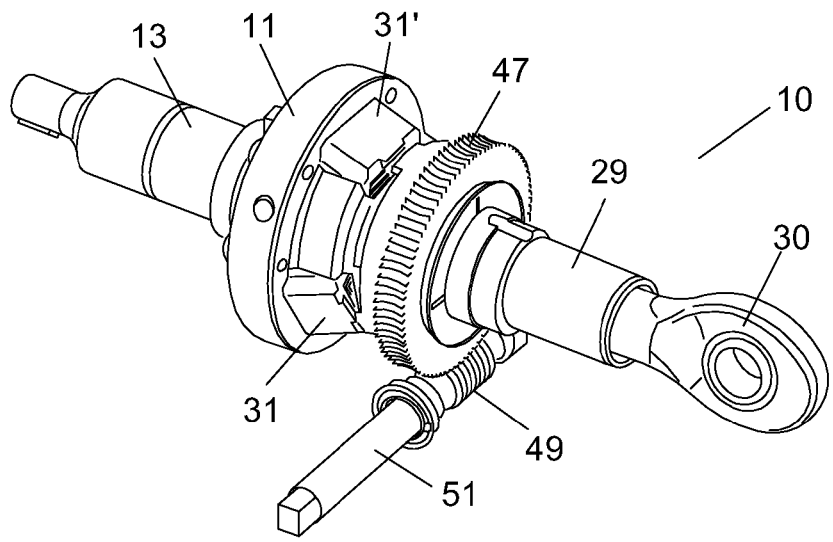
FIG. 5 is a perspective view of the main components of a linear actuator according to an embodiment of this invention incorporating releasing means of the output shaft showing the means used for driving the releasing means.

FIGS. 4a, 4b and 4c show the main components of an arrangement of the first helical roller gears 21, 21', 21" and the second helical roller gears 23, 23', 23" that allows a full release of the output shaft 29 when any component of the linear actuator 10 fails.

The first helical roller gears 21, 21', 21" and the second helical roller gears 23, 23', 23" are mounted by pairs 21, 23; 21', 23'; 21", 23" in gear carriers 31, 31', 31" that allow positioning the second helical roller gears 23, 23', 23" in an engaged or in a disengaged position with respect to the output shaft 29 in cooperation with a disk 41 rotatably mounted on the output shaft 29.

The gear carriers 31, 31', 31" are mounted pivoting around the axis 22, 22', 22" of the first helical roller gears 21, 21', 21" (that are rotatably mounted on the casing 11) by means of a spring 39 (see FIG. 2) and comprise protruding tabs 33, 33', 33" in their border in front of the disk 41.

The disk 41 comprises an axial extension having configured its border in front of the gear carriers 31, 31', 31" by a series of alternating protrusions 43, 43', 43" and recesses 45, 45', 45".

When the gear carriers 31, 31, 31' are mounted with their protruding tabs 33, 33', 33' in contact with protrusions 43, 43', 43" of the disk 41 (see FIG. 4a) the gear carriers 31, 31', 31"

are arranged in an engaged position according to the predefined preload and adjustment conditions of the second helical roller gears 23, 23', 23" with respect to the output shaft 29 minimizing or preventing any axial movement of it.

When the disk 41 is rotated and the protruding tabs 33, 33', 33' of the gear carriers 31, 31', 31 are positioned in front of recessions 45, 45', 45" of the disk 41, the gear carriers 31, 31', 31 are pivoted to a disengaged position (see FIG. 4*b*) by means of the spring 39.

The disk 41 comprises, as rotating means, a ring gear 47 coupled to a worm drive 49 driven by a suitable driving device 51, for example, an electric motor or a solenoid. Other types of driving elements for the ring gear 47, like helical gears (held in position with a brake when they are not operated) can be considered.

The linear actuator 10 further comprises control means connected to monitoring means for detecting a blockage or a degradation of any component for activating the driving device 51 when a need of releasing the output shaft 29 is detected by the monitoring means.

Said monitoring means comprise as detecting means dedicated sensors (acceleration, force) integrated into the linear actuator, or means using the control variables of the linear actuator (electric current, voltage, speed, position), or a combination of both, and a digital diagnostic system that can assess in real-time the evolution of selected parameters (in the time domain or in the frequency domain) and compare them with their expected evolution in the event of a linear actuator free of defects.

One advantage of the present invention is that the linear actuator has no re-circulating elements that involve a high probability of jamming.

Another advantage of the present invention is that the releasing mechanism acts over the output shaft. Therefore, after releasing the output shaft, a parallel actuator (in the above-mentioned case of a flight control surface actuated by a set of parallel actuators) should drag only the output shaft allowing a more compact design of the linear actuator and facilitating the operation of the parallel actuator.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A linear actuator comprising:
   a rotatory input shaft driven by an electric motor;
   an output shaft having a helical threaded zone in its external surface at its inner end;
   a first roller gear configured to rotate with respect to an axis of the first roller gear when the input shaft rotates;
   a plurality of second roller gears configured to engage with the first roller gear and with the output shaft in its helical threaded zone so that the rotation of the first roller gear is firstly transmitted to the second roller gears, which rotate with respect to their axes, and secondly converted in a linear movement of the output shaft,
   the input shaft having a helical threaded zone in its external surface at its inner end;
   the first roller gear comprising a plurality of first roller gears being helical gears configured to engage with the rotatory input shaft in its helical threaded zone and being arranged tangentially with respect to the input shaft; and
   the second roller gears being helical gears configured to engage with the first helical roller gears and being arranged tangentially with respect to the output shaft, the axes of the second roller gears being parallel to the axes of the first helical roller gears.

2. A linear actuator according to claim 1, wherein the input shaft is a hollow shaft and the output shaft is placed in an inner conduit comprising the inside of the input shaft.

3. A linear actuator according to claim 1, wherein the second helical roller gears have two threaded zones at two different levels: a first threaded zone for engaging with the first helical roller gear and a second threaded zone for engaging with the helical threaded zone of the output shaft.

4. A linear actuator according to claim 3, wherein cooperating pairs of the first and second helical roller gears are mounted in gear carriers in a pivoting manner with respect to the axes of the first helical roller gears so that they can hold the second helical roller gears in an engaging or in a disengaging position with respect to the output shaft.

5. A linear actuator according to claim 4, further comprising a disk rotatably mounted on the output shaft, wherein the gear carriers and the disk comprise cooperating means for keeping the second helical roller gears in an engaged or in a disengaged position with respect to the output shaft.

6. A linear actuator according to claim 5, wherein said cooperating means are protruding tabs in the gear carriers and a plurality of protrusions and recesses in the disk, so that the gear carriers are kept in an engaged position when their protruding tabs are in contact with the protrusions of the disk and in an disengaged position otherwise.

7. A linear actuator according to claim 1, comprising three first and second helical gears.

8. A linear actuator according to claim 7, wherein the disk further comprises a ring gear in its outer border coupled to a worm drive driven by a driving device for rotating the disk.

9. A linear actuator according to claim 8, further comprising monitoring means for detecting a jam or a degradation of one component and control means that activate the driving device when a jam or a degradation of one component is detected.

10. An aircraft component comprising a linear actuator according to claim 1.

* * * * *